US012617937B2

(12) United States Patent
Hatanaka et al.

(10) Patent No.: US 12,617,937 B2

(45) Date of Patent: May 5, 2026

(54) RESIN COMPOSITION AND GAS-BARRIER FILM USING SAME

(71) Applicant: MITSUBISHI CHEMICAL CORPORATION, Tokyo (JP)

(72) Inventors: Makoto Hatanaka, Tokyo (JP); Satoshi Ikubo, Tokyo (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 650 days.

(21) Appl. No.: 18/108,227

(22) Filed: Feb. 10, 2023

(65) Prior Publication Data

US 2023/0193004 A1 Jun. 22, 2023

Related U.S. Application Data

(63) Continuation of application No. PCT/JP2021/032036, filed on Sep. 1, 2021.

(30) Foreign Application Priority Data

Sep. 18, 2020 (JP) ................................ 2020-157179

(51) Int. Cl.

| | |
|---|---|
| ***C08L 23/0846*** | (2025.01) |
| ***C08J 5/18*** | (2006.01) |
| ***C08L 29/04*** | (2006.01) |
| ***E04C 2/10*** | (2006.01) |

(52) U.S. Cl.

CPC ............ *C08L 23/0846* (2013.01); *C08J 5/18* (2013.01); *C08L 29/04* (2013.01); *E04C 2/10* (2013.01); *C08J 2323/08* (2013.01); *C08J 2329/04* (2013.01); *C08J 2423/08* (2013.01); *C08J 2423/30* (2013.01); *C08J 2429/04* (2013.01); *C08L 2203/16* (2013.01); *C08L 2205/025* (2013.01); *C08L 2205/03* (2013.01)

(58) Field of Classification Search

CPC .... C08L 2201/14; C08L 29/04; C08L 23/084; C08L 23/0861; C08J 5/18

See application file for complete search history.

(56) References Cited

U.S. PATENT DOCUMENTS

| | | | | |
|---|---|---|---|---|
| 5,506,297 | A * | 4/1996 | Uehara | C08L 23/0861 524/320 |
| 2009/0149593 | A1 | 6/2009 | Funabiki et al. | |
| 2011/0020626 | A1* | 1/2011 | Okamoto | B32B 27/20 428/220 |
| 2019/0211200 | A1 | 7/2019 | Sakai et al. | |

FOREIGN PATENT DOCUMENTS

| | | | |
|---|---|---|---|
| CN | 102007179 | A | 4/2011 |
| JP | H06-200109 | A | 7/1994 |
| JP | H07-179709 | A | 7/1995 |
| JP | H09-165457 | A | 6/1997 |
| JP | 2007-126586 | A | 5/2007 |
| JP | 2010-260878 | A | 11/2010 |
| JP | 2014-81070 | A | 5/2014 |
| JP | 5916483 | B2 * | 5/2016 |
| WO | 2006/057351 | A1 | 6/2006 |

OTHER PUBLICATIONS

Decision of Refusal dated Jun. 20, 2025 issued in Chinese patent application No. 202180063638.8, with English translation thereof.

International Search Report Patent Application No. PCT/JP2021/032036, dated Nov. 16, 2021, along with English translation.

International Preliminary Report on Patentability Patent Application No. PCT/JP2021/032036, dated Mar. 21, 2023, along with English translation.

Office Action that issued in Chinese Patent Application No. 202180063638.8, dated May 9, 2024, along with English translation thereof.

Extended European Search Report issued in counterpart European Patent Application No. 21869167.3 dated Feb. 26, 2024.

Office Action dated Dec. 18, 2024 in Chinese patent application No. 202180063638.8, with English machine translation thereof.

Notification of Refusal Reasons dated Aug. 7, 2025 issued in Japanese patent application No. 2022-550444, with English translation thereof.

* cited by examiner

*Primary Examiner* — Gregory Listvoyb

(74) *Attorney, Agent, or Firm* — GREENBLUM & BERNSTEIN, P.L.C.

(57) ABSTRACT

[Problem] Provided is a resin composition capable of producing a film having an excellent gas-barrier property and a small variation in thickness.

[Solution] The resin composition comprises (A) an EVOH-based resin in an amount of at least 40% by weight but 99% by weight or less, (B) a PVA-based resin (B), and (C) an acid-modified polyolefin. The resin composition contains at most 1% of volatile content. The component (B) is preferably a PVA-based resin having a primary hydroxyl group in the side chain.

21 Claims, No Drawings

RESIN COMPOSITION AND GAS-BARRIER FILM USING SAME

CLAIM FOR PRIORITY

This application is a Continuation of PCT/JP2021/032036 filed Sep. 1, 2021, and claims the priority benefit of Japanese application 2020-157179 filed Sep. 18, 2020, the contents of which are expressly incorporated by reference herein in their entireties.

TECHNICAL FIELD

The present invention relates to a resin composition melt-moldable and capable of providing a film or gas-barrier layer having excellent gas-barrier properties.

BACKGROUND

A vinyl alcohol-based resin containing a repetitive vinyl alcohol unit, such as polyvinyl alcohol resin and ethylene-vinyl alcohol resin, has an excellent gas-barrier property due to a high crystallinity formed by hydroxyl groups therein. Such vinyl alcohol-based resin is used as a packaging film or gas-barrier layer in a package or container for leisure tools, toys, miscellaneous goods, daily necessities, parts, and the like, in a wide variety of fields including agricultural, civil engineering, industrial, and medical field, based on the excellent gas-barrier property.

From the viewpoint of its productivity of a laminate or a molded article, a vinyl alcohol-based resin used as a gas-barrier layer for a packaging film is required to be melt moldable. Among vinyl alcohol-based resins containing a repetitive vinyl alcohol unit, polyvinyl alcohol (PVA) has a high content of vinyl alcohol units and exhibits excellent gas-barrier property. However, the PVA has a decomposition temperature close to its melting point, which causes to be difficult in hot-melt molding. For this reason, using the PVA alone for a packaging material or the gas-barrier layer of the melt-molded article is actually limited.

In this regard, ethylene-vinyl alcohol-based resin (EVOH-based resin), which is a copolymer of ethylene and vinyl alcohol, can be melt-molded. EVOH-based resin may be used alone as a gas-barrier layer for a packaging material or a melt-molded article. However, an enhanced gas barrier property is demanded for the EVOH-based resin.

JP H07-179709 A (Patent Document 1) proposes a melt moldable resin composition having an excellent gas-barrier property. The resin composition comprises a polyvinyl alcohol in an amount of 40 to 80% by weight, an EVOH in an amount of 5 to 40% by weight, a thermoplastic resin having a softening temperature of 130° C. or less in an amount of 1 to 15% by weight, and polyethylene glycol in an amount of 5 to 15% by weight.

The resin composition disclosed in the patent document 1, employs a PVA having a polymerization degree of 300 to 3500, preferably 500 to 2000 and a saponification degree of 95 mol % or less from the viewpoint of film strength and moldability.

In the patent document 1, the resin composition was evaluated with respect to oxygen permeability of the multilayer film containing a core layer of the resin composition. The multilayer film was produced by blown film extrusion using a 4-type and 5-layer comparison and was also evaluated with respect to the state of multilayer film immediately after the blown film extrusion.

PRIOR ART

Patent Document

[Patent Document 1] JP H07-179709A

SUMMARY OF THE INVENTION

Technical Problem to be Solved by the Invention

In the Patent Document 1, a 4-type and 5-layer comparison was prepared and subsequently oriented to produce a 4-type and 5-layer film.

In the case of a resin composition prepared by adding a melt-moldable thermoplastic resin having a low softening temperature or a low melting point to a mixture of a PVA and an EVOH, the resin composition forms a film having a great variation in thickness. Such a film is inferior in moldability, which is a problem.

The present invention has been made under the circumstances. The purpose of the invention is to provide a resin composition exhibiting excellent moldability that can produce a film with excellent gas-barrier property and suppressed variation in thickness.

Means for Solving the Problem

A resin composition of the present invention comprises (A) an EVOH-based resin in an amount of more than 40% by weight but 99% by weight or less, (B) a PVA-based resin, and (C) an acid-modified polyolefin, wherein the resin composition has a volatile content of 1% or less.

A preferable content of the PVA-based resin (B) is 0.5% by weight or more but less than 59.9% by weight. A preferable content of the acid-modified polyolefin (C) is 0.1% by weight or more but less than 45% by weight.

A preferable PVA-based resin (B) has a melting point differing from its thermal decomposition temperature by 20° C. or more. In another aspect, a preferable PVA-based resin (B) has a primary hydroxyl group in the side chain. A side chain 1,2-diol-containing PVA-based resin having a structural unit represented by the following formula (1) is particularly preferred.

[Chemical formula 1]

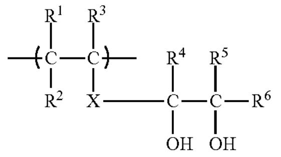

(1)

In the formula (1), $R^1$, $R^2$, $R^3$, $R^4$, $R^5$ and $R^6$ each independently represents a hydrogen atom or an organic group, and X represents a single bond or a binding chain.

A preferable acid-modified polyolefin (C) is a maleic anhydride-modified polyolefin. Maleic anhydride-modified polyethylene is more preferred.

The ratio [C/(A+B)] of the content of the acid-modified polyolefin (C) to the total sum of the contents of the EVOH-based resin (A) and the PVA-based resin (B) is preferably from 0.002 to 0.8. The ratio [A/B] in the contents of the EVOH-based resin (A) to the PVA-based resin (B) is preferably from greater than 1 to 40.

In another aspect, the present invention includes a molded article such as a film formed from the resin composition of the present invention, and a multilayer structure containing a layer made of the resin composition.

In further another aspect, the present invention includes a building sheet material. The building sheet material comprises (A) an EVOH-based resin, (B) a PVA-based resin, and (C).an acid-modified polyolefin. A preferable building sheet material is a sheet formed from the resin composition of the present invention.

Effect of the Invention

A resin composition of the present invention is excellent in moldability, and therefore, a film with little variation in thickness may be produced from the resin composition by melt-molding. The produced film has an excellent gas-barrier property.

EMBODIMENT FOR CARRYING OUT THE INVENTION

[Resin Composition]

The resin composition of the present invention is a resin composition comprising an ethylene-vinyl alcohol-based resin (EVOH-based resin) (A), a polyvinyl alcohol-based resin (PVA-based resin), and an acid-modified polyolefin (C). A volatile content of the resin composition is preferably 1% or less.

(A) Ethylene-Vinyl Alcohol-Based Resin (EVOH-Based Resin)

The EVOH-based resin used in the present invention is usually a resin obtained by saponifying an ethylene-vinyl ester copolymer, which is a copolymer of ethylene and a vinyl ester monomer. The EVOH-based resin is a water-insoluble thermoplastic resin. As the vinyl ester monomer, vinyl acetate is generally used from an economical point of view.

Ethylene and a vinyl ester monomer are polymerized by a conventionally known polymerization method such as solution polymerization, suspension polymerization, or emulsion polymerization. A solution polymerization using methanol as a solvent is commonly employed. And the resulting ethylene-vinyl ester copolymer may be saponified by a conventionally known method.

Thus produced EVOH-based resin usually contains an ethylene-derived structural unit and a vinyl alcohol structural unit. When the EVOH-based resin has a saponification degree less than 100 mol %, a slight amount of vinyl ester structural unit is contained as an unsaponified portion.

The vinyl ester monomer includes, not only vinyl acetate, but also aliphatic vinyl ester such as vinyl formate, vinyl propionate, vinyl valerate, vinyl butyrate, vinyl isobutyrate, vinyl pivalate, vinyl caprate, vinyl laurate, vinyl stearate, and vinyl versatate; aromatic vinyl ester such as vinyl benzoate; and aliphatic vinyl esters usually having from 3 to 20 carbon atoms, preferably 4 to 10 carbon atoms, particularly preferably 4 to 7 carbon atoms. The vinyl ester monomer may be used alone or in combination of two or more.

The ethylene content in the EVOH-based resin used in the invention can be adjusted by a pressure of ethylene supplied during the copolymerization of the vinyl ester monomer and ethylene. The content is usually from 20 to 60 mol %, preferably 25 to 50 mol %, particularly preferably 27 to 35 mol %. If the content is too low, the gas-barrier property and melt-molding property under high humidity tend to be deteriorated. On the other hand, if the content is too high, the gas-barrier property tends to be deteriorated. The ethylene content may be measured in accordance with ISO14663.

A saponification degree of the vinyl ester unit in the EVOH-based resin used in the invention may be adjusted by selecting an amount of saponification catalyst, temperature, time, and so on in the process of saponification of the ethylene-vinyl ester copolymer. As the saponification catalyst, an alkaline catalyst such as sodium hydroxide may be usually used. The saponification degree is generally from 90 to 100 mol %, preferably from 95 to 100 mol %, particularly preferably from 99 to 100 mol %. If the saponification degree is too low, the gas-barrier property tends to be deteriorated.

The saponification degree of the EVOH-based resin may be measured in accordance with JIS K6726. The measurement is conducted using a solution in which EVOH-based resin is uniformly dissolved in water/methanol solvent.

The melt flow rate (MFR) (210° C., load 2160 g) of the EVOH-based resin is usually from 0.5 to 100 g/10 minutes, preferably 1 to 50 g/10 minutes, and particularly preferably 3 to 35 g/10 minutes. If the MFR is too large, the film formation tends to be unstable, and if the MFR is too small, the viscosity remarkably increases to affect a melt extrusion of the resin composition.

The MFR may be an index of the polymerization degree of the EVOH-based resin, and can be adjusted by choosing an amount of the polymerization initiator and an amount of the solvent in the process of copolymerization of ethylene and vinyl ester monomer.

The EVOH-based resin may further contain a structural unit derived from a comonomer shown in below within a range not inhibiting the effect of the invention (for example, 10 mol % or less of EVOH-based resin).

Examples of the comonomers include olefins such as propylene, 1-butene and isobutene; hydroxyl group-containing α-olefins such as 3-buten-1-ol, 3-butene-1,2-diol, 4-penten-1-ol, and 5-hexene-1,2-diol, or a derivative such as ester or acylated product thereof; hydroxyalkyl vinylidenes such as 2-methylene propane-1,3-diol, and 3-methylene pentane-1,5-diol; hydroxyalkyl vinylidene diacetate such as 1,3-diacetoxy-2-methylene propane, 1,3-dipropionyloxy-2-methylene propane, and 1,3-dibutyryloxy-2-methylene propane; unsaturated acids such as acrylic acid, methacrylic acid, crotonic acid, phthalic acid (or its anhydride), maleic acid (or its anhydride), itaconic acid (or its anhydride) or salt thereof, or mono- or di-alkyl ester having from 1 to 18 carbon atoms in the alkyl group; acrylamides such as acrylamide, N-alkyl acrylamide having from 1 to 18 carbon atoms in the alkyl group, N,N-dimethylacrylamide, 2-acrylamide propanesulfonic acid or salt thereof, and acrylamide propyl dimethylamine or salt thereof or quaternary salt thereof; methacrylamides such as methacrylamide, N-alkyl-methacrylamide having from 1 to 18 carbon atoms in the alkyl group, N,N-dimethylmethacrylamide, 2-methacrylamide propanesulfonic acid or salt thereof, and methacrylamide propyl dimethylamine or its derivative salt or quaternary salt thereof; N-vinylamides such as N-vinylpyrrolidone, N-vinylformamide, and N-vinylacetamide; vinyl cyanides such as acrylonitrile and methacrylonitrile; vinyl ethers such as alkyl vinyl ether, hydroxyalkyl vinyl ether, and alkoxyalkylvinyl ether, having from 1 to 18 carbon atoms in respective alkyl group; vinyl halides such as vinyl chloride, vinylidene chloride, vinyl fluoride, vinylidene fluoride, and vinyl bromide; vinylsilanes such as trimethoxyvinylsilane; allyl halides such as allyl acetate and allyl chloride; allyl alcohols such as allyl alcohol and dimethoxy allyl alcohol; trimethyl-(3-acrylamide-3-dimethylpropyl)-ammonium chloride, acrylamide-2-methylpropanesulfonic acid and so on. These comonomers may be used alone or in combination of two or more.

In particular, an EVOH-based resin having a primary hydroxyl group in the side chain is preferable in terms of improved secondary moldability while keeping a gas-barrier property. Among them, EVOH-based resins obtained by copolymerizing a hydroxyl group-containing α-olefin is preferable, and an EVOH resin having 1,2-diol structure in a side chain is particularly preferable.

As the EVOH-based resin having a primary hydroxyl group in the side chain, it is preferable that the content of the structural unit derived from the monomer having the primary hydroxyl group is usually from 0.1 to 20 mol %, more preferably 0.5 to 15 mol %, particularly preferably 1 to 10 mol % of the EVOH-based resin.

Further, an EVOH-based resin "post-modified" such as urethanized, acetalized, cyanoethylated, or oxyalkylenated may be used in the invention.

Also, the EVOH-based resin used in the invention may be a mixture of two or more EVOH-based resins, for example, those having a different saponification degree, those having a different polymerization degree, and those containing a different copolymer-derived unit.

The content of the EVOH-based resin (A) in the resin composition of the invention is more than 40% by weight, preferably 50% by weight or more, particularly preferably 60% by weight or more, and 99% by weight or less, preferably 95% by weight or less, more preferably 90% by weight or less. If the content of the EVOH-based resin is too low, the gas-barrier property tends to be deteriorated. On the other hand, when the content of the EVOH-based resin (A) is too high, the moldability tends to be deteriorated.

(B) Polyvinyl Alcohol-Based Resin (PVA-Based Resin)

The PVA-based resin to be used in the invention (hereinafter also simply referred to as "PVA-based resin") is not particularly limited, and any PVA-based resin may be used. However, a PVA-based resin has a melting point higher than its thermal decomposition temperature preferably by 20° C. or more, more preferably by 50° C. or more, still more preferably by 80° C. or more, and particularly preferably by 100° C. or more. If the difference between the melting point and the thermal decomposition temperature falls in the above-mentioned range, the PVA-based resin would be stable when undergoing the melt molding operation.

In this specification, the thermal decomposition temperature refers to an onset temperature measured by TGA analysis. Also, the melting point is a temperature measured by DSC.

Examples of the PVA-based resin having a melting point different from its thermal decomposition temperature by 20° C. or more includes a PVA-based resin having a primary hydroxyl group in the side chain. The number of primary hydroxyl groups in the side chain is typically from 1 to 5, preferably 1 to 2, particularly preferably 1. The PVA-based resin may contain a secondary hydroxyl group in addition to the primary hydroxyl group. For example, a PVA-based resin having a 1,2-diol structure in the side chain, a PVA-based resin having a hydroxyalkyl group in the side chain, and the like may be used. Among them, a PVA-based resin having a structural unit represented by the following general formula (1) (hereinafter referred to as "side chain 1,2-diol-containing unit") is preferable because such a PVA-based resin usually has a melting point different from its thermal decomposition temperature by 50° C. or more.

[Chemical formula 1]

(1)

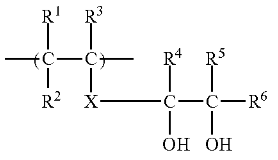

In the formula (1), $R^1$, $R^2$, $R^3$, $R^4$, $R^5$ and $R^6$ each independently represents a hydrogen atom or an organic group, and X represents a single bond or a binding chain.

Examples of the organic group include an alkyl group having from 1 to 4 carbon atoms such as methyl, ethyl, n-propyl, isopropyl, n-butyl, isobutyl and tert-butyl. The organic group may optionally have a functional group such as halogen, hydroxyl, ester group, carboxylic acid group, or sulfonic acid group.

Examples of the binding chain include a hydrocarbon such as alkylene, alkenylene, alkynylene, phenylene, and naphthylene (wherein at least one hydrogen atom of the hydrocarbon may be substituted with a halogen such as fluorine, chlorine, or bromine), —O—, $—(CH_2O)_m—$, $—(OCH_2)_m—$, $—(CH_2O)_mCH_2—$, —CO—, —COCO—, $—CO(CH_2)_mCO—$, $—CO(C_6H_4)CO—$, —S—, —CS—, —SO—, $—SO_2—$, —NR—, —CONR—, —NRCO—, —CSNR—, —NRCS—, —NRNR—, $—HPO_4—$, $—Si(OR)_2—$, $—OSi(OR)_2—$, $—OSi(OR)_2O—$, $—Ti(OR)_2—$, $—OTi(OR)_2—$, $—OTi(OR)_2O—$, —Al(OR)—, —OAl(OR)—, —OAl(OR)O—, and the like (each R is independently an optional substituting group, preferably a hydrogen atom or an alkyl group having from 1 to 12 carbon atoms, and m is a natural number). Among them, an alkylene group having 6 or less carbon atoms, particularly a methylene group, or $—CH_2OCH_2—$ is preferred from the viewpoint of stability in production and usage.

A preferable side chain 1,2-diol-containing PVA-based resin is a PVA-based resin in which all of $R^1$, $R^2$, $R^3$, $R^4$, $R^5$ and $R^6$ are hydrogen atoms and X is a single bond, that is, a PVA-based resin having a structural unit represented by the following formula (1').

[Chemical formula 2]

(1')

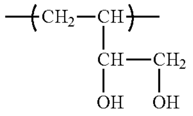

The side chain 1,2-diol-containing PVA-based resin having the above structural unit can be produced, for example, by (i) a method of saponifying a copolymer of a vinyl ester monomer and a compound represented by the following general formula (2), (ii) a method of saponifying and decarboxylating a copolymer of a vinyl ester monomer and a compound represented by the following general formula (3), or (iii) a method of saponifying and deketalizing a copolymer of a vinyl ester monomer and a compound represented by the following general formula (4).

[Chemical formula 3]

(2)

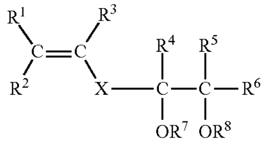

(3)

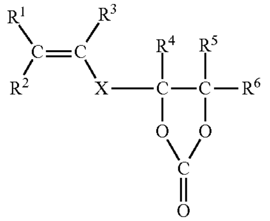

(4)

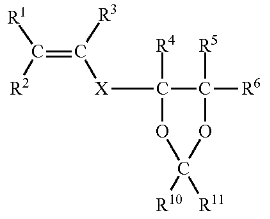

$R^1$, $R^2$, $R^3$, X, $R^4$, $R^5$ and $R^6$ in the general formulas (2), (3) and (4) are all the same as in the general formula (1). $R^7$ and $R^8$ are independently a hydrogen atom or $R^9$—CO— (wherein $R^9$ is an alkyl group having 1 to 4 carbon atoms). $R^{10}$ and $R^{11}$ are independently a hydrogen atom or an alkyl group having 1 to 4 carbon atoms. With regard to the methods (i), (ii) and (iii), for example, the method described in JP 2006-095825A can be used. Among them, 3,4-diacyloxy-1-butene, in particular, 3,4-diacetoxy-1-butene is preferably used as a compound represented by the general formula (2) in the method (i) from the viewpoint of excellent copolymerization reactivity and industrial handling.

Examples of the vinyl ester monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate and the like. Of these, vinyl acetate is preferably used because of economy.

In addition to the above-mentioned monomers (vinyl ester monomers, compounds represented by general formulas (2), (3), or (4)), α-olefins such as ethylene and propylene; hydroxy group-containing α-olefins such as 3-buten-1-ol, 4-penten-1-ol, 5-hexene-1,2-diol and derivatives such as acylated products thereof; unsaturated acids such as itaconic acid, maleic acid, acrylic acid, or salts, monoesters, or dialkyl esters thereof; nitriles such as acrylonitrile, amides such as methacrylamide and diacetoneacrylamide; olefin sulfonic acids such as ethylene sulfonic acid, allyl sulfonic acid, methallyl sulfonic acid, AMPS or a compound such as a salt thereof may be copolymerized, as long as it does not significantly affect the physical properties of the resin.

The PVA-based resin contains a vinyl alcohol unit and an unsaponified vinyl ester unit in addition to the structural unit represented by the above formula (1).

The saponification degree of the side chain 1,2-diol-containing PVA resin used in the invention is usually from 70 to 100 mol %, particularly 75 to 99 mol %, especially 80 to 95 mol %, further 85 to 90 mol %, as measured in accordance with JIS K6726. If the saponification degree is too low, the gas-barrier property and thermal stability during molding process tend to be lowered. If the saponification degree is too high, a compatibility of the PVA-based resin with the EVOH-based resin is lowered, which decreases stability in molding process.

The content of the structural unit represented by the general formula (1) contained in the side chain 1,2-diol-containing PVA-based resin is usually from 0.1 to 20 mol %, further 2 to 10 mol %, particularly 4 to 8 mol %, particularly preferably 5 to 7 mol %. If the content is too low, a compatibility of the PVA-based resin with the EVOH-based resin is lowered, which decreases stability in the molding process. If the content is too high, the reactivity of the PVA-based resin with the EVOH-based resin becomes high, which leads a remarkable increase in viscosity, resulting in lowering the molding stability.

The content of the structural unit represented by the general formula (1) in the side chain 1,2-diol-containing PVA-based resin can be obtained from the $^1$H-NMR spectrum (solvent: DMSO-d6, internal standard: tetramethylsilane) of the completely saponified PVA-based resin. Specifically, it can be calculated from peak areas derived from hydroxyl group protons, methine protons and methylene protons in structural units represented by the general formula (1), methylene protons in the main chain, protons of hydroxyl groups linked to the main chain, and the like.

The average of polymerization degree of the PVA-based resin (preferably a PVA-based resin having a primary hydroxyl group in the side chain, more preferably a side chain 1,2-diol-containing PVA-based resin) used in the present invention is preferably from 300 to 3000, more preferably 350 to 1000, especially 400 to 600, as measured according to JIS K6726. If the average of polymerization degree is too small, the melt tension tends to be decreased and the stability during the molding process tends to be decreased. On the other hand, a PVA-based resin having an unduly high average of polymerization degree tends to increase in temperature during molding process due to shear, which results in lowering stability of the molding process.

The content of the PVA-based resin (B) is preferably from 0.5% by weight or more, more preferably 3% by weight or more, particularly preferably 5% by weight or more, and less than 59.9% by weight, preferably 45% by weight or less, particularly preferably 30% by weight or less. If the content of the PVA-based resin (B) is too low, the moldability tends to be deteriorated. On the other hand, if the content of the PVA-based resin (B) is too high, the thermal stability tends to be lowered.

To achieve an intended moldability and thickness stability of the resulting film, the ratio [A/B] in contents of the EVOH-based resin (A) and the PVA-based resin (B) is from 0.7 to 40, preferably the content of the EVOH-based resin is greater than that of the PVA-based resin. Therefore, a preferable ratio [A/B] is more than 1, more preferably 1.1 or more and 2 or more, but 40 or less, more preferably 30 or less, and particularly preferably 20 or less. When the ratio [A/B] is less than 0.7, the thermal stability of the resin composition tends to be decreased, and when the ratio [A/B] exceeds 40, the moldability tends to be decreased.

(C) Acid-Modified Polyolefin

Acid-modified polyolefin to be used in the invention is an acid modified product obtained by chemically bonding a modifier such as unsaturated carboxylic acid or its anhydride to a hydrocarbon polymer (polyolefins) whose main chain is composed of C—C bonds (carbon single bond) through an addition reaction or a graft reaction. Such acid-modified polyolefin may act as a compatibilizer which assists to make an EVOH-based resin compatible with a PVA-based resin.

Examples of the polyolefins include an olefin homopolymer such as polyethylene, polypropylene, and polybutene; a copolymer of ethylene and α-olefin having from 3 to 20 carbon atoms (e.g. ethylene-α-olefin copolymer); a copolymer obtained by copolymerizing two or more olefins (e.g. olefin heteropolymer); styrene-olefin copolymer in which styrene attends to the C—C bond of the main chain by copolymerizing styrene with olefin; hydrogenated olefin polymers such as hydrogenated styrene/diene-based block copolymer (e.g. SEBS and SEPS). The hydrogenated olefin polymer is a hydrogenated diene-based copolymer obtained by using a diene-based compound (e.g. butadiene) instead of olefin, and has a main chain consisting of only C—C single bond by hydrogenating the diene-based copolymer.

An ethylene-based compound which contains an element other than hydrocarbons, typically vinyl esters such as vinyl acetate, can be copolymerized with an olefin to produce a copolymer having a main chain composed of C—C single bonds. However, the copolymer obtained by using the ethylene-based compound is not included in the acid-modified polyolefin (C).

Examples of unsaturated carboxylic acids or an anhydride thereof used for modification include α,β-unsaturated monocarboxylic acids such as acrylic acid, methacrylic acid, ethacrylic acid and crotonic acid; α,β-unsaturated dicarboxylic acids such as fumaric acid, itaconic acid, citraconic acid, maleic acid, monomethyl maleate and monoethyl maleate, or its anhydrides, half ester, and so on. These may be used alone or in combination of two or more.

The acid-modified polyolefin used in the present invention is a modified product obtained by appropriately modifying the said polyolefin with an unsaturated carboxylic acid or its anhydride as a modifier. The acid value of the acid-modified polyolefin is usually from 50 mgKOH/g or less, preferably 30 mgKOH/g or less, and particularly preferably 20 mgKOH/g or less. An acid-modified polyolefin having an unduly high acid value has relatively many reaction points with a hydroxyl group in the EVOH-based resin or PVA-based resin. Therefore, an excessively polymerized product tends to be produced in the melt-kneading process, and the highly polymerized product may cause to impair the stability of the resin composition during extrusion processing. As a result, a molded article with an excellent quality may not be provided. The lower limit of the acid value is usually 1 mgKOH/g, preferably 2 mgKOH/g. The acid value is measured according to JIS K0070.

With regard to the acid-modified polyolefin, a polymer modified with maleic anhydride as a modifier is preferable. With regard to the polyolefin to be modified, olefin homopolymer, ethylene/α-olefin copolymer, hydrogenated styrene/diene compound copolymers (e.g. SEBS and SEPS) are preferable. More specific examples of the acid-modified polyolefins include maleic anhydride-modified polyolefin (e.g. maleic anhydride-modified polyethylene, maleic anhydride-modified polypropylene), maleic anhydride-modified ethylene/α-olefin copolymer, maleic acid-modified SEBS, and the like.

(i) Maleic Anhydride-Modified Polyolefin

Maleic anhydride-modified polyolefin is a polymer obtainable by modifying a polyolefin with maleic anhydride. The modification method is not particularly limited. The modification may be achieved by that maleic anhydride attends as a comonomer to a polymerization process for the production of polyolefin. Alternatively, the modification may also be achieved by that maleic anhydride is introduced into a side chain of polyolefin by graft reaction such as radical addition.

Examples of polyolefins to be modified with maleic anhydride include olefin homopolymer such as polyethylene, polypropylene, and polybutene; copolymer of two types of olefins such as ethylene-α-olefin copolymer; hydrogenated copolymer of styrene and diene compound, and the like. Ethylene-α-olefin copolymer and polyethylene are preferred, and polyethylene is particularly preferred because of less yellowish.

Examples of the ethylene-α-olefin copolymer include ethylene-propylene copolymer, ethylene-1-butene copolymer, ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer, ethylene-1-butene-1-octene copolymer, and the like. Preferred are ethylene-1-butene copolymer, ethylene-1-hexene copolymer, ethylene-1-octene copolymer, ethylene-1-butene-1-hexene copolymer, ethylene-1-butene-1-octene copolymer.

The hydrogenated copolymer of styrene and diene compound include, for example, hydrogenated styrene/butadiene block copolymer (SEBS) and hydrogenated styrene/isoprene block copolymer (SEPS).

Regarding as the maleic anhydride-modified polyolefin, a maleic anhydride-modified polyethylene has a melt flow rate (MFR) (190° C., load 2160 g) of usually 0.01 to 150 g/10 minutes, preferably 0.1 to 50 g/10 minutes, more preferably 1 to 25 g/10 minutes, still more preferably 3 to 10 g/10 minutes. A maleic anhydride-modified ethylene-α-olefin copolymer has a MFR (230° C., load 2160 g) of usually 0.1 to 150 g/10 minutes, preferably 0.5 to 100 g/10 minutes, more preferably 1 to 50 g/10 minutes, still more preferably 5 to 35 g/10 minutes.

If the maleic anhydride-modified polyolefin has a MFR outside the above range, the compatibility of the maleic anhydride-modified polyolefin with the EVOH-based resin or the PVA-based resin tends to be lowered, which lowers dispersibility in the process of mixing them. The resulting film by melt extrusion tends to be varied in thickness due to a lowered effect of suppressing variations in the thickness of films.

(ii) Other Acid-Modified Polyolefins

Other acid-modified polyolefin is a polymer obtained by modification using an α,β-unsaturated carboxylic acid other than maleic anhydride or its anhydride, as a modifier. The modification method is not particularly limited. The modification may be achieved by that the α,β-unsaturated carboxylic acid attends as a comonomer to a polymerization process for the production of polyolefin. Alternatively, the modification may also be achieved by that the α,β-unsaturated carboxylic acid or its anhydride is introduced into a side chain of polyolefin by graft reaction such as radical addition.

The polyolefins listed for the polyolefins to be modified with maleic anhydride are identical to polyolefins to be modified with an α,β-unsaturated carboxylic acid other than maleic anhydride. As the polyolefin, an ethylene-α-olefin copolymer is preferably used.

α,β-unsaturated carboxylic acid or anhydride thereof used for the said other acid modification include α,β-unsaturated monocarboxylic acids such as acrylic acid, methacrylic acid, ethacrylic acid and crotonic acid; α,β-unsaturated dicarboxylic acids such as fumaric acid, itaconic acid, citraconic acid, maleic acid, monomethyl maleate and monoethyl maleate, or its anhydrides (excluding maleic anhydride). These α,β- unsaturated carboxylic acids or anhydride thereof may be used alone or in combination of two or more.

The melt flow rate (MFR) (230° C., load 2160 g) of the said other acid-modified polyolefin (ii), especially acid-modified ethylene-α-olefin copolymer, is usually 0.01 to 150 g/10 minutes, preferably 0.1 to 50 g/10 minutes, more preferably 1 to 25 g/10 minutes, still more preferably 1.5 to 10 g/10 minutes. If the MFR is outside the aforementioned range, the compatibility of the other acid-modified polyolefin with the EVOH-based resin and the PVA-based resin tends to be lowered, and the dispersibility during the mixing process tends to be lowered. As a result, the effect of suppressing variations in thickness of the film produced by melt extrusion tends to be decreased.

The density of the acid-modified polyolefin (C) is usually 1.00 g/$cm^3$ or less, preferably less than 0.95 g/$cm^3$, particularly preferably 0.93 g/$cm^3$ or less. The lower limit of the density of the acid-modified ethylene-α-olefin copolymer (C) is usually 0.80 g/$cm^3$, preferably 0.85 g/$cm^3$, particularly preferably 0.87 g/$cm^3$. The acid-modified polyolefin (C) having a density within the aforementioned range is preferable for securing the compatibility.

The amount of the acid-modified polyolefin (C) contained in the resin composition is from 0.1 to 45% by weight, preferably 1 to 30% by weight, particularly preferably 2 to 15% by weight. An unduly small amount of the acid-modified polyolefin would not sufficiently suppress fluctuation in thickness of the resulting film because a desired compatibility by the acid-modified polyolefin is not obtained. On the other hand, an unduly large amount of the acid-modified polyolefin (C) causes to impair the gas-barrier property.

For these reasons, with regard to the amount of the acid-modified polyolefin (C) which may act as a compatibilizer, a ratio ([C/(A+B)]) of the content of the acid-modified polyolefin (C) to the total sum of the contents of the EVOH-based resin (A) and the PVA-based resin (B) is 0.002 or more, preferably 0.01 or more, more preferably 0.02or more and 0.8 or less, preferably 0.45 or less, particularly preferably 0.20 or less. When the content ratio is less than 0.002, a sufficient suppressing effect to the fluctuation in thickness of the resulting film may not be obtained. When the content ratio exceeds 0.8, gas-barrier property of the resulting film tends to be decreased.

(D) Other Ingredients (i) Other Resin

The resin composition of the present invention may contain another polymer within a range that does not impair the effects of the present invention (for example, less than 10% by weight, preferably less than 5% by weight of the composition). Examples of the another polymer allowed to be contained include a variety of thermoplastic resin such as polyamide, polyester, polyethylene, polypropylene, and polystyrene.

(ii) Other Additive

In addition, as long as the effect of the present invention is not hindered (for example, 10% by weight or less of the composition), plasticizer, reinforcing agent, filler, pigment, dye, lubricant, antioxidant, antistatic agent, ultraviolet absorber, heat stabilizer, light stabilizer, surfactant, antibacterial agent, antistatic agent, drying agent, antiblocking agent, flame retardant, cross-linking agent, curing agent, foaming agent, crystal nucleating agent, and the like may be contained, according to needs.

[Manufacturing Method and Characteristics of Resin Composition]

The resin composition having the composition as described above may be prepared as a pellet obtained (i) by melt-kneading EVOH-based resin, PVA-based resin, acid-modified polyolefin, and other components, and thereafter pelletizing an obtained mixture, or prepared as a mixture of pellets obtained (ii) by blending EVOH-based resin pellet, PVA-based resin pellet, and acid-modified polyolefin pellet.

In the case of (i), the order of adding the EVOH-based resin, the PVA-based resin, the acid-modified polyolefin, and other components is not particularly limited. Also, a masterbatch which is a mixture of two specific resins or a mixture of a resin and other components is prepared in advance, and then, the remaining components may be added according to their predetermined contents.

In the case of (ii), pellets of each component are charged in a predetermined ratio in a container and is blended mechanically to provide a mixture of pellets.

The resin composition of the present invention prepared as described above has a volatile content of 1% or less, preferably 0.5% or less, and particularly preferably 0.3% or less. If the volatile content exceeds 1%, foaming tends to occur during the process of film formation, and a produced film tends to have a poor appearance.

The content of the volatile component is measured as a change in weight after drying at 170° C. for 15 minutes with a halogen moisture meter. In the case of the resin composition prepared by the method (ii), the volatile content of the resin composition is calculated as a sum of the total volatile contents derived from each component which is obtained by multiplying the percentage to the composition. Also, in the case of pellets of the resin composition prepared by the method (i), the sum of the volatile contents is also calculated by multiplying the percentage of the respective component of the pellet.

[Use]

The resin composition of the present invention may be molded to produce a molded article such as film, sheet, cup, fiber, or the like. Melt-molding is preferably employed as the molding method. The melt-molding method includes extrusion molding (T-die extrusion, tubular film extrusion, blow molding, melt spinning, profile extrusion, etc.), injection molding, and the like. An appropriate melt-molding temperature may be usually selected from the range of 150° C. to 300° C. The obtained molded article (film, sheet, cup, fiber, etc.) may also be subjected to a secondary processing such as uniaxial or biaxial orienting and vacuum forming.

A film, sheet, or cup produced by melt-molding of the resin composition of the present invention is not limited to a single-layer film, a sheet, or a molded article made of the resin composition. A multilayer structure containing other resin sheet or a substrate such as a film, paper, non-woven fabric, or metal foil, in addition to the film or sheet of the resin composition is also included in the invention.

The multilayer structure may be produced by a method of laminating a melt-extruded substrate onto a film or sheet formed from the resin composition of the invention, a method of laminating a melt-extruded resin composition of the invention onto a substrate, a method of co-extruding a substrate with the resin composition of the invention, a method of dry-laminating of a film or sheet formed from the resin composition of the invention and a substrate with use of a known adhesive such as an organic titanium compound, an isocyanate compound, a polyester compound, a polyurethane compound, or the like.

The resin composition of the invention may provide a film having an excellent gas-barrier property and less variation in thickness. Therefore, the aforementioned various lamination methods may be employed for the production of a multilayer structure.

[Gas-Barrier Film]

The gas-barrier film of the present invention is a single-layer film prepared by melt-molding the resin composition of the invention. Alternatively, a multilayer film containing the said single-layer film or a layer made of the resin composition.

The resin composition of the present invention is capable of undergoing melt molding. The resin composition may be solely extrusion-melt-molded to produce a film having an excellent gas-barrier property but colorless and free from a thickness variation. Accordingly, the film formed from the composition may be used as a single-layer gas-barrier film, as well as a multi-layer structure containing a gas-barrier layer made of the resin composition in combination with a variety of substrate or film.

The gas-barrier film of the present invention and the multilayer film containing the gas-barrier film as a barrier layer can be used as various packaging materials, for example, packaging material such as shrink film, capsule and a case for pharmaceuticals, food including coffee, cosmetics such as lotion and foundation, metallic parts and electronic components, and any other goods whose property should be protected from the deterioration due to oxidation or moisture absorption, or any substances that are concerned about odor transfer or odor leakage.

[Building Sheet Material]

A resin composition containing an EVOH-based resin (A), a PVA-based resin (B), and an acid-modified polyolefin (C) may be used as a building sheet material set between the outer wall and the inner wall of a building, because the resin composition may provide a sheet having an excellent humidity control property besides excellent gas-barrier property.

The EVOH-based resin, PVA-based resin, and acid-modified polyolefin previously listed in the present invention may be employed as the EVOH-based resin, PVA-based resin, and acid-modified polyolefin contained in the resin composition for building sheet material. Also, the earlier specified content ratios for the components contained in the resin composition of the present invention may be preferably employed for the content ratios of the respective components for the building sheet material.

The configuration of the sheet material used for construction is not particularly limited. Any sheet composed of a resin composition containing an EVOH-based resin, a PVA-based resin, and an acid-modified polyolefin belongs to the scope of the present invention.

The building sheet of the invention may be a laminate in combination with a substrate formed from other plastic sheet substrate such as polyethylene or polypropylene sheet, wood plate, non-woven fabric plate, and the like. A laminate containing a layer made of a resin composition containing an EVOH-based resin, a PVA-based resin, and an acid-modified polyolefin, preferably a laminate containing at least one resin layer or film composed of the resin composition of the present invention, belongs to the scope of the present invention.

In the case of forming a laminate with the aforementioned substrate, the substrate may be laminated by an adhesive interposed therebetween, or may be laminated by pressure bonding or the like without using an adhesive.

EXAMPLES

Hereinafter, the present invention will be described in more detail with reference to examples and comparative examples, but the present invention is not limited to the following examples.

[Physical Properties of the Resin Composition]

1. Saponification Degree (mol %)

It was measured in accordance with JIS K 6726.

2. Average of Polymerization Degree

It was measured in accordance with JIS K 6726.

3. Modification Rate (mol %)

It was calculated based on amounts of the copolymerized monomers charged for polymerization.

4. Volatile Content

The volatile content was indicated as a reduced amount in weight before and after drying at 170° C. for 15 minutes using a halogen moisture meter (Moisture Analyzer HS153, manufactured by Mettler Toledo). The volatile content of the resin composition was calculated as a sum of amounts of volatile components contained in the resin composition. The respective amount of a volatile component was obtained by multiplying its content percentage of the resin composition.

[Film Formability of Single-Layer Film]

A single-layer film was produced by melt extrusion molding with use of a ϕ40 mm single-screw extruder which was set as the following conditions and set as 20 μm in a thickness of the extruded film.

Extrusion speed: 40 rpm, 16 m/minutes

Barrel settings: C1/C2/C3/C4/H/D=200° C./220° C./230° C./240° C./240° C./240° C.

A case where a continuous film was stably produced was evaluated as "OK", and a case where a production of a continuous film was hindered due to film breakage was evaluated as "NG".

[Measurement and Evaluation of Single-Layer Film Formation]

1. Thickness of Single-Layer Film

At the center of the single-layer film made from the resin composition (near the center of the film in both of the width direction and the machine direction), the film thickness (μm) was measured with a thickness gauge (SMD-565J-L, manufactured by Teclock) at 5 points in the width direction and 5 points in the machine direction at intervals of 5 cm (total 25 points).

Average thickness, maximum thickness, minimum thickness, and thickness variation which is a difference between maximum thickness and minimum thickness, were determined based on the 25 measured points.

2. Coloring of Single-Layer Film

The appearance of the single-layer film made from the resin composition was visually observed, and the colored level was evaluated according to the following 4 criteria of I to IV.

I: No yellowness at all

II: Almost no yellowness

III: Slight yellowness

IV: Notable yellowness

[Preparation and Evaluation of Resin Composition]

1. Components (A) EVOH-Based Resin

Used was an EVOH-based resin having 32 mol % in ethylene content, 12 g/10 minutes in MFR (2160 g, 210° C.), 99.7 mol % in saponification degree, and 0.12% by weight in volatile content.

(B) PVA-Based Resin

Used was a side chain 1,2-diol-containing PVA-based resin having 88 mol % in saponification degree, 6 mol % in modification rate corresponding to a content of structural unit containing side chain 1,2-diol, 450 in average of polymerization degree, 0.26% by weight in volatile content, 157° C. in melting point, 303° C. in thermal decomposition temperature, and 6 g/10 minutes in MFR (2160 g, 190° C.).

a single-layer film using a ϕ40 mm single-screw extruder according to the aforementioned evaluation method.

With regard to the resin composition Nos. 1 to 14, the volatile content of the resin composition, the formability of the single-layer film, variation in the thickness of the produced single-layer film, and the colored level were evaluated according to the above-mentioned measurement and evaluation method. Table 1 shows the results.

TABLE 1

| | | | | | | | | evaluation | | | | |
|---|---|---|---|---|---|---|---|---|---|---|---|---|
| | composition (% by weight) | | | | | | | single- | thickness (μm) | | | |
| No | (A) | (B) | (C) | | C/(A + B) | A/B | volatile content | layer film formability | average of 25 points | Min/Max | variation | yellowness |
| 1 | 76.2 | 19.0 | C-1 | 4.8 | 0.05 | 4 | 0.15 | OK | 21 | 18/23 | 5 | I |
| 2 | 90.5 | 4.8 | C-1 | 4.8 | 0.05 | 19 | 0.13 | OK | 21 | 17/24 | 7 | I |
| 3 | 47.6 | 47.6 | C-1 | 4.8 | 0.05 | 1 | 0.19 | OK | 21 | 17/27 | 10 | III |
| 4 | 79.2 | 19.8 | C-1 | 1.0 | 0.01 | 4 | 0.15 | OK | 15 | 11/22 | 11 | II |
| 5 | 66.7 | 16.7 | C-1 | 16.7 | 0.2 | 4 | 0.14 | OK | 21 | 18/25 | 7 | I |
| 6 | 53.3 | 13.3 | C-1 | 33.3 | 0.5 | 4 | 0.14 | OK | 20 | 17/22 | 5 | I |
| 7 | 45.7 | 11.4 | C-1 | 42.9 | 0.75 | 4 | 0.14 | OK | 21 | 19/23 | 4 | I |
| 8 | 76.2 | 19.0 | C-2 | 4.8 | 0.05 | 4 | 0.15 | OK | 20 | 18/23 | 5 | II |
| 9 | 76.2 | 19.0 | C-3 | 4.8 | 0.05 | 4 | 0.15 | OK | 22 | 18/25 | 7 | II |
| 10 | 76.2 | 19.0 | C-4 | 4.8 | 0.05 | 4 | 0.15 | OK | 21 | 19/24 | 5 | II |
| 11 | 80.0 | 20.0 | — | — | — | 4 | 0.15 | OK | 60 | 5/162 | 157 | III |
| 12 | 4.8 | 90.5 | C-1 | 4.8 | 0.05 | 0.05 | 0.25 | OK holes at the edge | 20 | 18/23 | 5 | IV |
| 13 | 40.0 | 10.0 | C-1 | 50.0 | 1 | 4 | 0.13 | NG | — | — | — | — |
| 14 | 76.2 | 19.0 | C-5 | 4.8 | 0.05 | 4 | 0.15 | NG | — | — | — | — |

(C) Acid-Modified Polymer:

C-1, C-2, C-3, and C-4 shown below were acid-modified polyolefins obtained by modifying a polyolefin with maleic anhydride. C-5 was an acid-modified polymer obtained by modifying a polymer (EVA) whose main chain was composed of a C—C single bond, with maleic anhydride, and therefore C-5 did not belong to an acid-modified polyolefin.

C-1: Maleic anhydride-modified polyethylene (MODIC M545, manufactured by Mitsubishi Chemical Corporation) having 0.12% by weight in volatile content, 6 g/10 minutes in MFR (2160 g, 190° C.), and 0.9 g/$cm^3$ in density.

C-2: Maleic anhydride-modified polypropylene (MODIC P664, manufactured by Mitsubishi Chemical Corporation) having 0.2% by weight in volatile content, 3.5 g/10 minutes in MFR (2160 g, 230° C.), and 0.89 g/$cm^3$ in density.

C-3: Maleic anhydride-modified ethylene/α-olefin copolymer (TAFMER MA9015, manufactured by Mitsui Chemicals, Inc.) having 0.27% by weight in volatile content, 23 g/10 minutes in MFR (2160 g, 230° C.), and 0.896 g/$cm^3$ in density.

C-4: Maleic anhydride-modified SEBS (Tuftec M1911, manufactured by Asahi Kasei Corporation) having 0.28% by weight in volatile content, 2 mg $CH_3ONa$/g in acid value, 4.5 g/10 minutes in MFR (2160 g, 230° C.), and 0.91 g/$cm^3$ in density.

C-5: Maleic anhydride grafted EVA resin ("FUSABOND™ C190" manufactured by DuPont), having 0.99% by weight in volatile content, 16 g/10 minutes in MFR (2160 g, 190° C.), and 0.95 g/$cm^3$ in density.

Resin composition Nos. 1 to 14 were prepared by blending pellets (A) to (C) in their contents (% by weight) shown in Table 1. Thus prepared resin composition was formed into As can be seen from Table 1, resin composition Nos. 1 to 10 each was able to produce a single-layer film without any particular concerns. In addition, variation in thickness was suppressed, and thus moldability was excellent. In particular, in the case that a resin composition contained the component (B) in an amount greater than that of the component (A) and employed the component (C-1) as the component (C), the resin composition provided a film with less colored (Nos. 1, 2, and 4 to 7).

In the case of the resin composition without an acid-modified polyolefin (No. 11), a single-layer film with a large variation in thickness was produced, which was a problem with moldability. The large variation in the thickness was considered to cause from a lack of compatibility between the components (A) and (B). On the contrary, in the case of the resin composition containing an unduly high content of the acid-modified polyolefin (No. 13), the continuous film formation was frequently hindered due to the occurrence of film breakage.

On the other hand, when the content of the component (A) was low and the content of the component (B) was too high (No. 12), a single-layer film could be produced. However, fish eyes were observed in the produced film and holes were generated at the edges of the film, which were concerns with formability of the film. In addition, the film was notably yellowish, which was disadvantage as a molding material (No. 12). In addition, it can be seen from Nos. 3, 11, and 12 that increased content of the PVA-based resin seems to cause the coloring of the film.

It was also found from the comparison of No. 1 and Nos. 8 to 10 that the resin composition containing (C-1) as the component (C) could enhance the resistance of the resin composition to be yellowed. Therefore, the component (C-1) was superior to other types of component (C)

These results show that the resin composition containing the components (A), (B), and (C) in specific contents may have an excellent moldability and excellent coloring resistance.

From a comparison of No. 1 and No. 14, when an acid-modified polymer (C-5) which does not belong to an acid-modified polyolefin was used as the component (C), film breakage frequently occurred during the film formation, which hindered a continuous formation of the film. It was understood that adjusting the content ratio of the components (A), (B) and (C) to an appropriate ratio respectively and employing an acid-modified polyolefin are effective for a stable production of a single-layer film.

INDUSTRIAL APPLICABILITY

The resin composition of the present invention can provide a film with little variation in thickness and having an excellent gas-barrier property. Therefore, the resin composition of the invention is useful for the production of a single-layer gas-barrier film for various packaging materials, and a gas-barrier layer in a multilayered structure combined with a variety of films or substrates.

The invention claimed is:

1. A resin composition comprising
   (A) EVOH-based resin in an amount of at least 40% by weight but 99% by weight or less;
   (B) PVA-based resin; and
   (C) Acid-modified polyolefin;
   wherein the ratio [A/B] of the content of the EVOH-based resin (A) to the content of the polyvinyl alcohol-based resin (B) is greater than 1;
   wherein the ratio [C/(A+B)] of the content of the acid-modified polyolefin (C) to the total sum of the contents of the EVOH-based resin (A) and the polyvinyl alcohol-based (B) resin is 0.02 or more and 0.8 or less, and
   wherein the resin composition has greater than 0% and at most 1% of a volatile content.

2. The resin composition according to claim 1, wherein the PVA-based resin (B) is contained in an amount of 0.5% by weight or more and 45% by weight or less of the resin composition.

3. The resin composition according to claim 1, wherein the acid-modified polyolefin (C) is contained in an amount of 0.1% by weight or more but less than 45% by weight of the resin composition.

4. The resin composition according to claim 1, wherein the PVA-based resin (B) has a melting point different from a thermal decomposition temperature by 20° C. or more.

5. The resin composition according to claim 1, wherein the PVA-based resin (B) is a PVA-based resin having a primary hydroxyl group in a side chain.

6. The resin composition according to claim 1, wherein the PVA-based (B) resin is a side chain 1,2-diol-containing PVA-based resin having a structural unit represented by the following formula (1),

[Chemical formula 1]

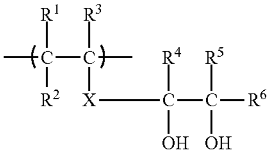

(1)

(In the formula (1), $R^1$, $R^2$, $R^3$, $R^4$, $R^5$ and $R^6$ each independently represents a hydrogen atom or an organic group, and X represents a single bond or a binding chain).

7. The resin composition according to claim 1, wherein the acid-modified polyolefin (C) is a maleic anhydride-modified polyolefin.

8. The resin composition according to claim 7, wherein the maleic anhydride-modified polyolefin is maleic anhydride-modified polyethylene.

9. The resin composition according to claim 1, wherein the ratio [A/B] of the content of the EVOH-based resin (A) to the content of the PVA-based resin (B) is 40 or less.

10. A molded article formed from a resin composition, the resin composition comprising
   (A) EVOH-based resin in an amount of at least 40% by weight but 99% by weight or less;
   (B) PVA-based resin; and
   (C) Acid-modified polyolefin;
   wherein the ratio [A/B] of the content of the EVOH-based resin (A) to the content of the polyvinyl alcohol-based resin (B) is greater than 1;
   wherein the ratio [C/(A+B)] of the content of the acid-modified polyolefin (C) to the total sum of the contents of the EVOH-based resin (A) and the polyvinyl alcohol-based (B) resin is 0.02 or more and 0.8 or less, and
   wherein the resin composition has greater than 0% and at most 1% of a volatile content.

11. A molded article according to claim 10, wherein the molded article is a film.

12. A multilayer structure containing a layer comprising a resin composition, the resin composition which comprises (A) EVOH-based resin in an amount of at least 40% by weight but 99% by weight or less, (B) PVA-based resin, and (C) Acid-modified polyolefin,
   wherein the ratio [A/B] of the content of the EVOH-based resin (A) to the content of the polyvinyl alcohol-based resin (B) is greater than 1;
   wherein the ratio [C/(A+B)] of the content of the acid-modified polyolefin (C) to the total sum of the contents of the EVOH-based resin (A) and the polyvinyl alcohol-based (B) resin is 0.02 or more and 0.8 or less, and
   wherein the resin composition has at most 1% of a volatile content.

13. A building sheet material comprising a resin composition which comprises (A) an EVOH-based resin, (B) a PVA-based resin, and (C) an acid-modified polyolefin,
   wherein the ratio [A/B] of the content of the EVOH-based resin (A) to the content of the polyvinyl alcohol-based resin (B) is greater than 1; and
   wherein the ratio [C/(A+B)] of the content of the acid-modified polyolefin (C) to the total sum of the contents of the EVOH-based resin (A) and the polyvinyl alcohol-based (B) resin is 0.02 or more and 0.8 or less, and
   wherein the resin composition has greater than 0% and at most 1% of a volatile content.

14. The resin composition according to claim 1, wherein the ratio [A/B] of the content of the EVOH-based resin (A) to the content of the polyvinyl alcohol-based resin (B) is greater than 1.1.

15. The resin composition according to claim 1, wherein the ratio [A/B] of the content of the EVOH-based resin (A) to the content of the polyvinyl alcohol-based resin (B) is greater than 2.0.

16. The molded article according to claim 10, wherein the ratio [A/B] of the content of the EVOH-based resin (A) to the content of the polyvinyl alcohol-based resin (B) is greater than 1.1.

17. The molded article according to claim 10, wherein the ratio [A/B] of the content of the EVOH-based resin (A) to the content of the polyvinyl alcohol-based resin (B) is greater than 2.0.

18. The multilayer structure according to claim 12, wherein the ratio [A/B] of the content of the EVOH-based resin (A) to the content of the polyvinyl alcohol-based resin (B) is greater than 1.1.

19. The multilayer structure according to claim 12, wherein the ratio [A/B] of the content of the EVOH-based resin (A) to the content of the polyvinyl alcohol-based resin (B) is greater than 2.0.

20. The building sheet material according to claim 13, wherein the ratio [A/B] of the content of the EVOH-based resin (A) to the content of the polyvinyl alcohol-based resin (B) is greater than 1.1.

21. The building sheet material according to claim 13, wherein the ratio [A/B] of the content of the EVOH-based resin (A) to the content of the polyvinyl alcohol-based resin (B) is greater than 2.0.

* * * * *